March 27, 1962 H. GRUBER 3,026,530
NECKTIE KNOT SUPPORT
Filed Feb. 1, 1961
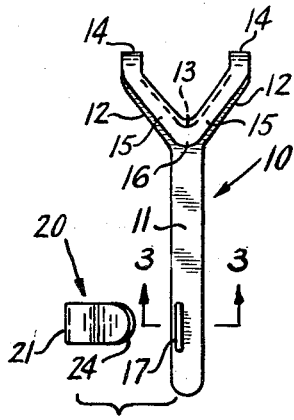
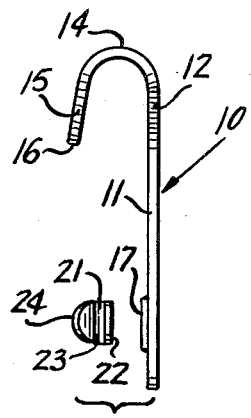
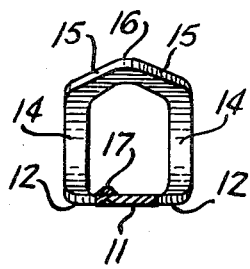
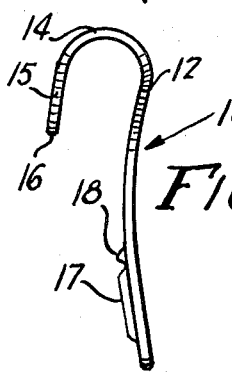
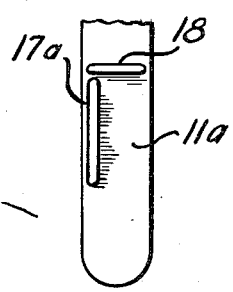
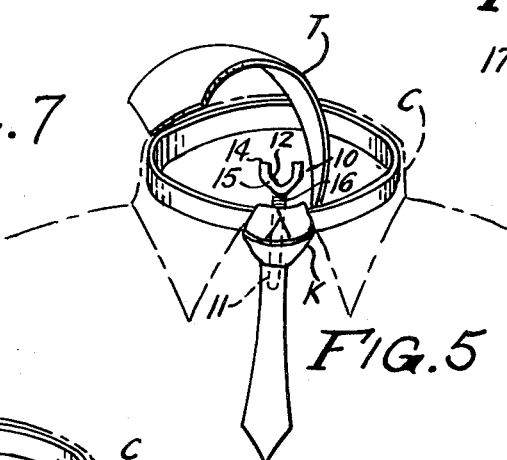
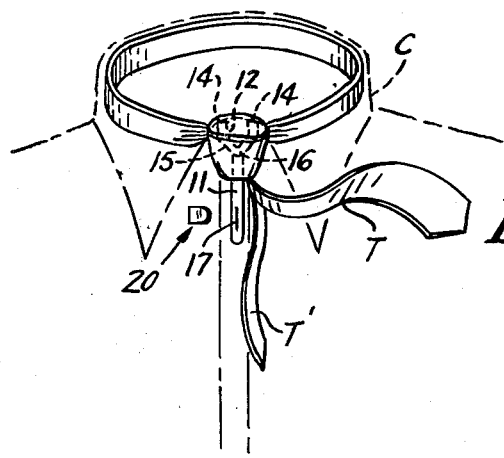
INVENTOR
HENRY GRUBER
BY
Kimmel & Crowell
ATTORNEYS

United States Patent Office 3,026,530
Patented Mar. 27, 1962

3,026,530
NECKTIE KNOT SUPPORT
Henry Gruber, 7420 Wise Ave., St. Louis, Mo.
Filed Feb. 1, 1961, Ser. No. 86,440
1 Claim. (Cl. 2—153)

This invention relates to a necktie and knot support and more particularly to a former and support for forming a Windsor knot.

A primary object of the invention is the provision of a necktie knot support for facilitating the forming and supporting of a Windsor knot of uniform size and shape.

An additional object of the invention comprises the provision of a support of this character which constitutes an improvement over my prior patent entitled "Necktie Knot Support," No. 2,972,749.

A further object of the invention is the provision of a device of this character which is simple to attach and utilize, and which makes possible the formation of a uniform knot by an inexperienced person.

Other objects reside in the combinations of elements, arrangements of parts, and features of construction, all as will be more fully pointed out hereinafter and shown in the accompanying drawings wherein:

FIGURE 1 is an exploded plan view of one form of necktie knot support constructed in accordance with the instant invention.

FIGURE 2 is a side elevational view of the device of FIG. 1.

FIGURE 3 is a sectional view taken substantially along the line 3—3 of FIG. 1 as viewed in the direction indicated by the arrows.

FIGURE 4 is an enlarged fragmentary plan view similar to a portion of FIG. 1 showing a modified form of construction.

FIGURE 5 is a front elevational view of the device of FIG. 1 shown in the initial stages of forming a knot thereon; and FIGURE 6 is a view similar to FIG. 5 but showing the successive and concluding steps of forming the knot.

FIGURE 7 is a side elevational view of a modified shape of the device of FIGURE 1.

Similar reference characters refer to similar parts throughout the several views of the drawing.

Referring now to the drawings in detail, there is generally indicated at 10 a knot support constructed in accordance with the instant invention. The support comprises an elongated shank 11, the upper portion of which is bifurcated to provide two angularly disposed arms 12 with a V-shaped opening 13 therebetween. Each arm 12 is reverted as at 14, and terminates in an inwardly extending portion 15, which portions join at 16 to provide a V-shaped member which facilitates the forming of the knot.

The lower portion of shank 11 is provided adjacent one side with a bar or rib 17, the purpose of which will be more fully described hereinafter.

A generally U-shaped spring clip generally indicated at 20 is adapted to be employed with the device, in a manner to be more fully described hereinafter, and includes a bight portion 21 and a pair of legs 22 and 23, the leg 23 having an outwardly flared end portion 24 to facilitate the positioning of the clip over bar 17 on shank 11.

FIGURE 4 discloses a modified form of device wherein a shank 11a is provided with a vertical bar or ridge 17a similar to the bar 17, and a transverse bar 18 is extended across the surface of shank 11a above the end of bar 17a, and forms a stop member.

In the use and operation of the device, as best shown in FIG. 5, the tie T is inserted under the collar C in the usual manner, and the Windsor knot K is formed about the shank portion 11 as disclosed in FIG. 5. The knot is completed as indicated in FIG. 6. The spring clip 20 is slipped over the under portion T1 of the tie and the shank 11 and engages over the rib 17 to be held securely in position, the bar 18 serving as an upper limit stop to limit upward travel of the clip 20. The outwardly flared end portion 24 serves to facilitate the positioning of the clip over the shank and tie.

FIGURE 7 shows the same device as in FIGURES 1 and 2 with only the exception that the shank 11 is curved instead of straight, for self-evident reasons.

From the foregoing it will now be seen that there is herein provided an improved necktie knot support which accomplishes all of the objects of this invention, and others, including many advantages of great practical utility.

As many embodiments may be made of this inventive concept, and as many modifications may be made in the embodiment hereinbefore shown and described, it is to be understood that all matter herein is to be interpreted merely as illustrative, and not in a limiting sense.

I claim:

A necktie knot support comprising a narrow straight upright shank having an outwardly flared generally triangular upper portion and an arcuately reverted generally V-shaped end portion depending in spaced parallel relation to said upper portion, said upper portion and said V-shaped portion being cut away to form a central recess, upstanding arcuate shoulder portions formed on opposite sides of the cut away portions forming bights connecting said upper portion and said end portion, an integral longitudinally extending ridge formed on said shank adjacent one side thereof, and a U-shaped resilient clip adapted to engage over said ridge and a portion of a necktie for holding the portion of the necktie in position on said shank, and stop means formed on said shank adjacent the upper end of said ridge adapted to retain said U-shaped spring clip against vertical upward movement, said stop means comprising an integral transverse bar disposed at right angles to and adjacent said integral longitudinally extending ridge on said shank.

References Cited in the file of this patent

UNITED STATES PATENTS

| 718,307 | Borst | Jan. 13, 1903 |
| 2,424,580 | Pennock | July 29, 1947 |
| 2,972,749 | Gruber | Feb. 28, 1961 |

FOREIGN PATENTS

| 14,338 | Great Britain | June 18, 1909 |